United States Patent [19]

Hamblin et al.

[11] Patent Number: 5,684,296
[45] Date of Patent: Nov. 4, 1997

[54] FIBER OPTIC LIQUID SENSING SYSTEM

[75] Inventors: Jesse R. Hamblin; Avinash Prabhakar, both of North Arlington, N.J.

[73] Assignee: Optical Systems Industries, Inc., North Arlington, N.J.

[21] Appl. No.: 664,711

[22] Filed: Jun. 17, 1996

[51] Int. Cl.$^6$ .......................... G01H 15/06; G08B 21/00
[52] U.S. Cl. .................... 250/227.11; 250/577; 340/619; 356/436
[58] Field of Search ...................... 250/573–577, 250/227.11, 904; 356/436–440; 340/619

[56] References Cited

U.S. PATENT DOCUMENTS

| | | | |
|---|---|---|---|
| 3,835,315 | 9/1974 | Gravitt, Jr. | 250/574 |
| 4,631,529 | 12/1986 | Zeitz | 340/619 |
| 4,764,671 | 8/1988 | Park | 250/577 |
| 4,816,695 | 3/1989 | Lavin | 250/573 |
| 5,466,946 | 11/1995 | Kleinschmitt et al. | 250/577 |
| 5,510,895 | 4/1996 | Sahagen | 356/436 |

*Primary Examiner*—Stephone Allen
*Attorney, Agent, or Firm*—Cohen, Pontani, Lieberman & Pavane

[57] ABSTRACT

An optical liquid sensing system for sensing liquids in contact with an optical sensing component is provided. The sensing system comprises an optical sensor connected to a control module by a fiber optic cable having two fiber optic strands, the first for receiving light emitted by the control module, and the second for receiving light reflected from a distal reflector. The strands terminate in a longitudinally oriented common ferrule within the optical sensor. The optical sensor is generally cylindrical and includes a distal reflector opposite and in a spaced relationship to the ferrule. A group of apertures is defined in the circumferential wall of the housing so as to permit entry of liquid into the housing and to draw liquid proximally located to the sensor into the housing via capillary action. When an amount of liquid insufficient to flood the sensor enters the housing, the shape of the sensor and the arrangement of interior components of the sensor cause the liquid to be formed into a liquid cylinder spanningly disposed between the ferrule and the reflector. The reflective inner surface of the liquid cylinder causes the amplitude of a light signal introduced into the housing by the first strand to be increased in amplitude before being received by the second strand. When the sensor is flooded with liquid, the light signal from the first strand is attenuated before being received by the second strand. The control module detects variances in the amplitude of light received by the second strand when the sensor is in contact with or is flooded by a liquid and indicates to a user that presence of a liquid has been detected by the sensor.

28 Claims, 3 Drawing Sheets

FIBER OPTIC LIQUID SENSING SYSTEM

BACKGROUND OF THE INVENTION

1. Field of the Invention

The present invention relates generally to devices for sensing liquids, and more particularly to an optical sensor for detecting the presence of water or other liquid in an environment which is generally intended to be liquid free.

2. Background

Liquid sensors are widely used in a variety of industrial applications. Of particular importance are liquid sensors used in environments where the presence of even a small amount liquid is undesirable or dangerous, such as certain process vessels, electrical generators and shipboard hull interiors. Typical electronic liquid sensors used in such applications suffer from numerous disadvantages. Electronic sensors must be heavily shielded from electromagnetic interference which can distort the sensor readings. Furthermore, electronic sensors emit electrical signals which may interfere with other sensitive electronic equipment. Electronic sensors have a limited temperature operating range because high or low temperatures have a significant effect on sensitive electronic components. They may suffer from channel crosstalk or other phenomena associated with transmitting electrical signals over long distances. When used in extremely volatile environments, electronic sensors may be unsafe as even a small spark in the sensor may create a dangerous condition. Finally, electronic sensors are expensive to manufacture and maintain due to the number and complexity of their components.

Other types of liquid sensors have been developed to address some of the drawbacks of electronic liquid sensors. For example, optical liquid sensors, which use light to detect the presence of liquids, address some of the disadvantages of previously known electronic sensors because they transmit signal information to remote sensor electronics using light instead of electricity. Thus, optical sensors are generally safer than electronic sensors and may work at a longer range. However, typical optical sensors are expensive and difficult to manufacture, often requiring high precision custom optical components and complex remote electronic sensing equipment. Some optical sensors are also relatively large in size to facilitate installation and protection of internal complex optics. Typical optical sensors are also fragile, requiring care in installation and in use. In addition, typical optical sensors detect presence of a liquid only when the sensor is immersed in the liquid or when the liquid to be detected is directed through an optical sensor assembly. Thus, previously known optical sensors are of limited use in applications where liquids are undesirable and thus are likely to be present in only small quantities. Yet another disadvantage of some previously known optical liquid sensors is that the sensors are not reversible, requiring manual re-adjustment of the sensor after each detection.

It would thus be desirable to provide an optical liquid sensor which is capable of detecting even a minimal quantity of liquid. It would further be desirable to provide an optical sensor which is physically rugged and which can withstand a high range of temperatures as well as harsh and corrosive environments. It would also be desirable to provide an optical sensor which is inexpensive, easy to manufacture, small in size, and completely reversible. It would further be desirable to provide an optical liquid sensor, such that a signal generated from a dry to a wet state is sufficiently large to allow the use of simple detection electronics.

SUMMARY OF THE INVENTION

In accordance with the present invention, an optical liquid sensing system for detecting the presence of water or other liquid in an environment which is generally intended to be liquid-free is provided. A sensor component of the optical liquid sensing system comprises two parallel fiber optic strands, the first strand for transmitting light generated by a light source and the second strand for receiving light reflected from a distal reflector. The fiber optic strands terminate in a common ferrule which is longitudinally oriented in a generally cylindrical sensor housing. A mirror or other reflective surface is placed opposite, and in predeterminately spaced relation to, the terminating ends of the fiber strands. Defined in the circumferential wall of the cylindrical sensor housing are a series of apertures which permit the entry of liquid into the interior of the sensor housing.

Upon leaving the sensor housing, the pair of fiber optic strands are formed into a flexible insulated cable which is connected to a control module. The control module includes a light emitter device connected to the first fiber optic strand for transmitting light via the first strand and a photo-sensing device connected to the second fiber optic strand for sensing light received via the second strand and for deriving a voltage value from the sensed light proportional to the sensed light's amplitude. The photo-sensing device is connected to a comparator circuit which compares the voltage derived by the photo-sensing device with a voltage value or a range of voltage values pre-defined by the manufacturer of the control module. Two indicators —"wet" and "dry"— are provided on the external surface of the control module to inform the user whether the optical sensor has detected the presence of liquid. An on/off control switch is also provided for controlling the delivery of power to the control module.

The operation of the optical sensor is dependent on its physical configuration which may be adjusted to enable the detection of liquids with varying properties. For example, in a preferred embodiment of the present invention the relationship between the housing size and shape, and the size and location of the apertures and ferrule, is such that a droplet of water, or a liquid with similar properties entering the sensor housing will adhere to the interior surface of the sensor housing and form a liquid cylinder spanningly disposed between and coupling the ferrule and the reflector or, alternatively, will form a liquid film across at least one of the apertures. Because the surface of liquids, including water, is highly reflective, the light reflections within the optical sensor are amplified by the presence of the reflective cylindrical water droplet thus formed within the sensor housing between the optical fibers and the reflective mirror. As a result, the light signal amplitude rises in the presence of the liquid droplet within the sensor housing. The increased amplitude of the light received by the photo-sensing device via the second strand results in a proportional increase in the value of the voltage derived by the photo-sensing device. When the comparator determines that the increased voltage is higher than the predetermined voltage or voltage range, the "wet" indicator is activated to inform a user that the sensor has detected the presence of a liquid. Thus, one of the objectives of the invention lies in physically configuring the optical sensor such that in the presence of liquid in direct contact with the sensor, a liquid droplet or conduit is formed in the sensor housing interior to cause an amplification of the optically-communicated light beam and, correspondingly, of the voltage or current detected in the control module.

In the presence of larger quantities of water or of pressurized water or liquid, the optical sensor will operate in a more conventional manner, such that the optical signal strength will decrease in the presence of a quantity of water sufficient to completely or substantially fill the sensor housing interior or to otherwise physically obstruct the path of light emitted or received by the fiber optic strands, and thereby attenuate the light beam transmitted via the first fiber optic strand as it is reflected from the mirror or other reflective surface back to the second fiber optic strand. The decreased amplitude of the light received by the photo-sensing or detecting device via the second strand results in a proportional decrease in the value of the voltage derived by the photo sensing device. When the comparator determines that the decreased voltage is lower than the predetermined value or range, the "WET " indicator is activated to inform a user that the sensor has detected the presence of liquid. Accordingly, the presence of water or other liquids in the sensed environment is determined when the control module detects either an attenuation or an amplification of the reflected optical signal.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF A PRESENTLY PREFERRED EMBODIMENT

Figure 1:
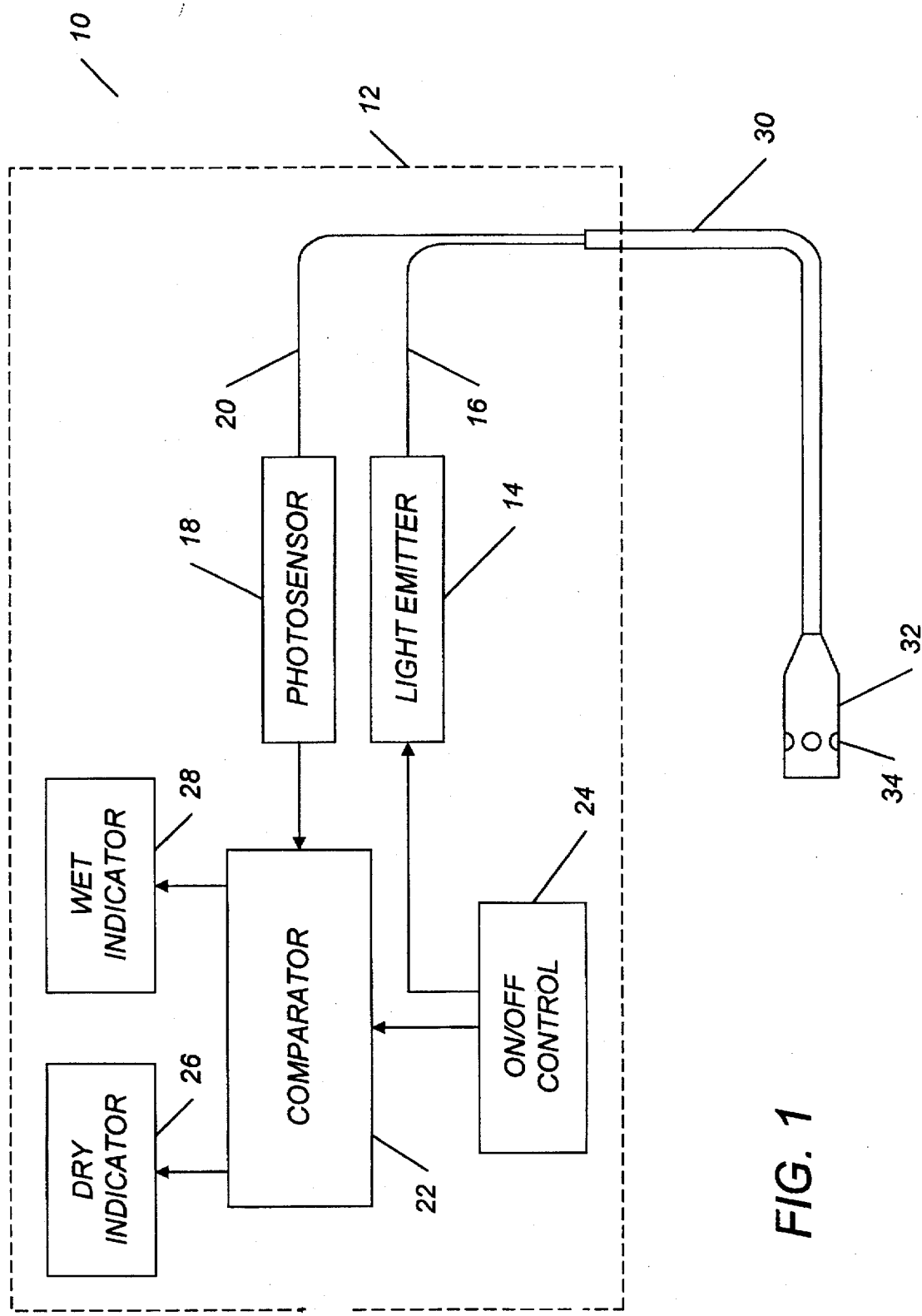
FIG. 1 is a block diagram of an optical liquid sensing system including a control module and an optical sensor constructed in accordance with the present invention.

Although the present invention is described with reference to a specific embodiment of an optical sensor and a control module for detecting the presence of water, or a liquid with similar properties, it should be understood that the optical sensor and the control module of the present invention may be readily adapted for detecting the presence of other liquids by varying the optical sensor's physical configuration and by varying the type of light emitted by the control module. For example, alternate sources of light may include any radiation emitting device such as a laser. All such variations are intended to be included within the scope of the present invention. It will also be recognized that, in the drawings, amplification and biasing circuitry for the control module is not shown in detail as such circuitry is well-known and is commonly used in conjunction with comparators and light emitting and sensing devices.

Referring to FIG. 1, an optical liquid sensing system 10 consists of a control module 12, and an optical sensor 32 connected to the control module 12 by a fiber optic cable 30. The cable 30 contains a transmitting fiber optic strand 16 and a receiving fiber optic strand 20. The cable 30 is preferably insulated to prevent physical damage to the strands 16 and 20, as well as to protect the strands from adverse environmental conditions such as high and low temperatures and a corrosive atmosphere. The length of the cable 30 is limited only by the progressive loss of light signal power in the fiber optic strands, which is insignificant up to a distance of several miles. Thus, the length of the cable 30 may advantageously range from a few inches to several miles. The strands 16 and 20 are preferably multi-mode step index optical fibers, but other optical fibers with similar optical characteristics may be used. One skilled in the art will appreciate that a single fiber optic strand may be used to substitute for the strands 16 and 20 by using a Y-splitter without departing from the spirit of the present invention. If a single fiber optic strand is used, it may function as both a transmitting and a receiving strand.

The cable 30 terminates in the optical sensor 32 which is described in greater detail below in connection with FIGS. 2 and 3. A series of apertures 34 are circumferentially defined through and about the external surface or peripheral wall of the optical device 32.

The control module 12 includes a light emitter 14 which is preferably a light emitting diode (LED) chosen to provide one of red, green, amber, yellow, infrared or blue light. However, other light emitting devices such as laser diodes of varying wavelengths may also be used. The light emitter 14 is connected to the transmitting strand 16 which is decoupled from the cable 30 inside the control module 12. The light emitter 14 preferably includes amplification circuitry (not shown) and a lens (not shown) to maximize the amount of light introduced into the transmitting strand 16. The light emitter 14 is also preferably configured to provide a pulsed light signal at a predetermined frequency, although alternatively a continuous light signal may be provided. Pulsed light signals are advantageous because pulsed signals typically operate at a frequency different from that of ambient light, such as 60 Hz and 120 Hz fluorescent light. As a result, the use of pulsed light signals decreases the likelihood that the optical sensor 32 will be affected by the presence of ambient light entering or shining through the apertures 34. The light emitter 14 is supplied with power from an external power source (not shown) via an on/off control 24, which power source preferably includes an AC/DC power converter. The on/off control 24 provides power to all components of the control module 12 as necessary from the external power source, although not all connections are shown in the drawing.

The control module 12 also includes a photosensor 18 which is preferably a photodiode. However, other light-sensing devices that are capable of deriving a voltage value from the amplitude of a received light signal may alternatively be used. The photosensor 18 is connected to the receiving strand 20 which is decoupled from the cable 30 inside the control module 12. The photosensor 18 generates a voltage signal with a magnitude proportional to the amplitude of light received via the receiving strand 20. As a result, if the amplitude of the light signal received from the receiving strand 20 increases or decreases due to the presence of liquid within the optical sensor 32, then the output voltage of the photosensor 18 changes. Accordingly, the photosensor 18 also preferably includes amplification circuitry (not shown) to amplify its voltage output to a predetermined level. When the sensor 32 is not in contact with any liquid, a steady voltage $V_{DRY}$ is generated by the photosensor 18 from the reflected light signal originally emitted by light emitter 14 and received via the receiving strand 20. When the sensor 32 is in contact with a small quantity of liquid, not sufficient to fill its interior completely but sufficient to form a liquid cylinder or conduit internal to the sensor 32, the high reflectiveness of the surface or periphery of the liquid cylinder reflectively increases the amplitude of the light signal originally emitted by light emitter 14. Accordingly, the photosensor 18 generates a higher voltage $V_{HIGH}$ than the steady voltage $V_{DRY}$ when the higher amplitude light signal is received via the receiving strand 20. When the sensor 32 is in contact with a large quantity of liquid sufficient to substantially fill its interior, the presence of the liquid inside the sensor 32 causes the light signal originally emitted by light emitter 14 to be attenuated, thereby decreasing its amplitude. Accordingly, the photosensor 18 generates a lower voltage $V_{LOW}$ than the steady voltage $V_{DRY}$ when the lower amplitude light signal is received via the receiving strand 20.

The photosensor 18 is connected to a comparator 22. The comparator 22 is preferably an under/over voltage comparator with built-in hysteresis. However, other devices or circuits for comparing voltage signals to a predetermined value or range of values may be used. The outputs of the comparator 22 are connected to a dry indicator 26 and to a wet indicator 28. A base voltage value approximately equal to the steady voltage $V_{DRY}$, corresponding to a dry state of the sensor 32, is preferably pre-defined in the comparator 22. Alternatively, the base voltage may be a voltage range with an upper and a lower limit to take into account minor variances in $V_{DRY}$ during the operation of the optical liquid sensing system 10. The comparator 22 is preferably configured such that when a signal approximately equal to $V_{DRY}$ is received from the photosensor 18, the comparator 22 only powers the dry indicator 26 but, when a voltage signal higher or lower than $V_{DRY}$ (or the predefined base voltage range) is received from the photosensor 18 (such as $V_{HIGH}$ or $V_{LOW}$), the comparator 22 only powers the wet indicator 28. The dry indicator 26 is preferably an LED of a green color; however, other types of indicator lights or colors may be used. The wet indicator 28 is preferably an LED of a red color and, here, too other types of indicator lights or colors may be used. Optionally, the wet indicator 28 may incorporate an audible tone generator (not shown) which generates an audible signal when the wet indicator 28 is powered by the comparator 22. Optionally, the comparator 22 may transmit a signal indicative of the dry and/or the wet state of the sensor 22 to an external computer (not shown) in addition to, or instead of, to the dry and wet indicators 26 and 28, respectively.

Figure 2:
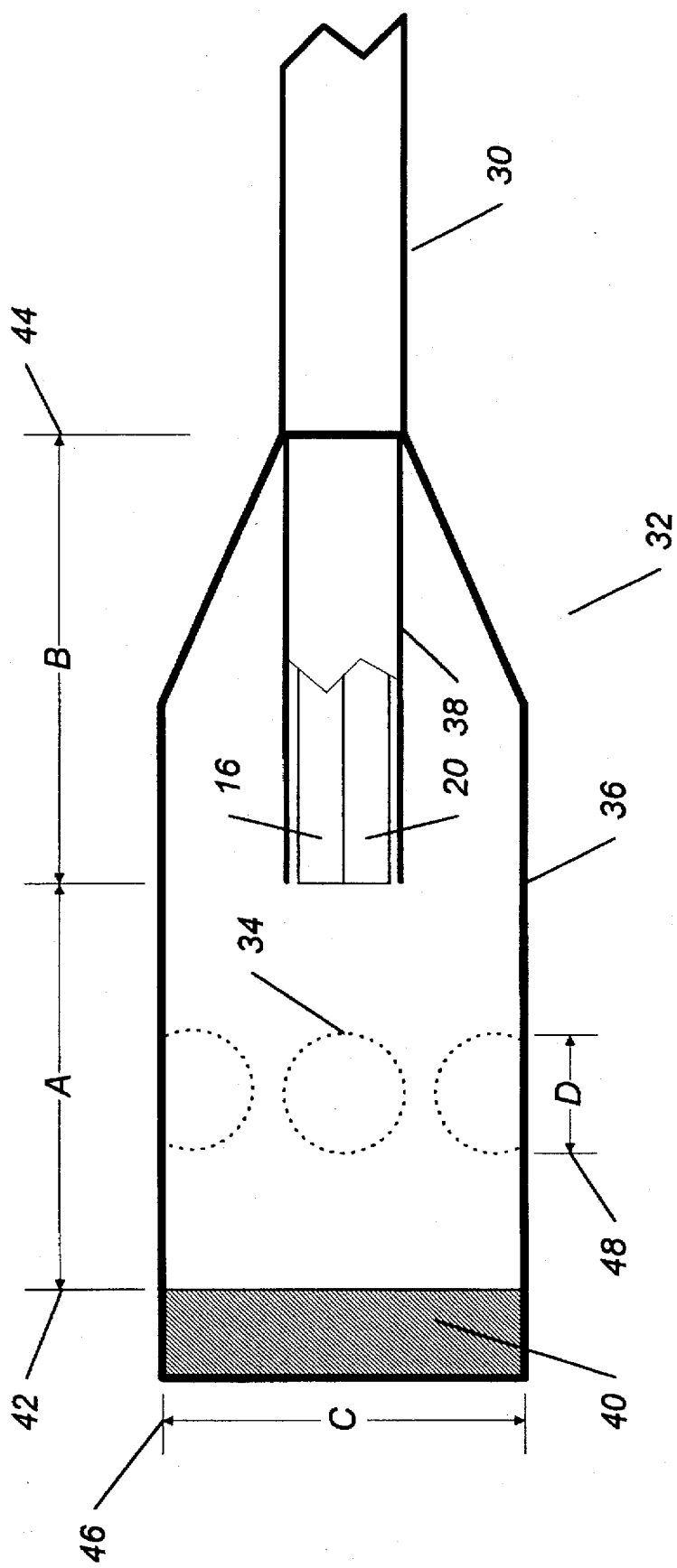
FIG. 2 is a schematic top view of the optical sensor of FIG. 1 for detecting presence of liquid in contact with the optical sensor.
Figure 3:
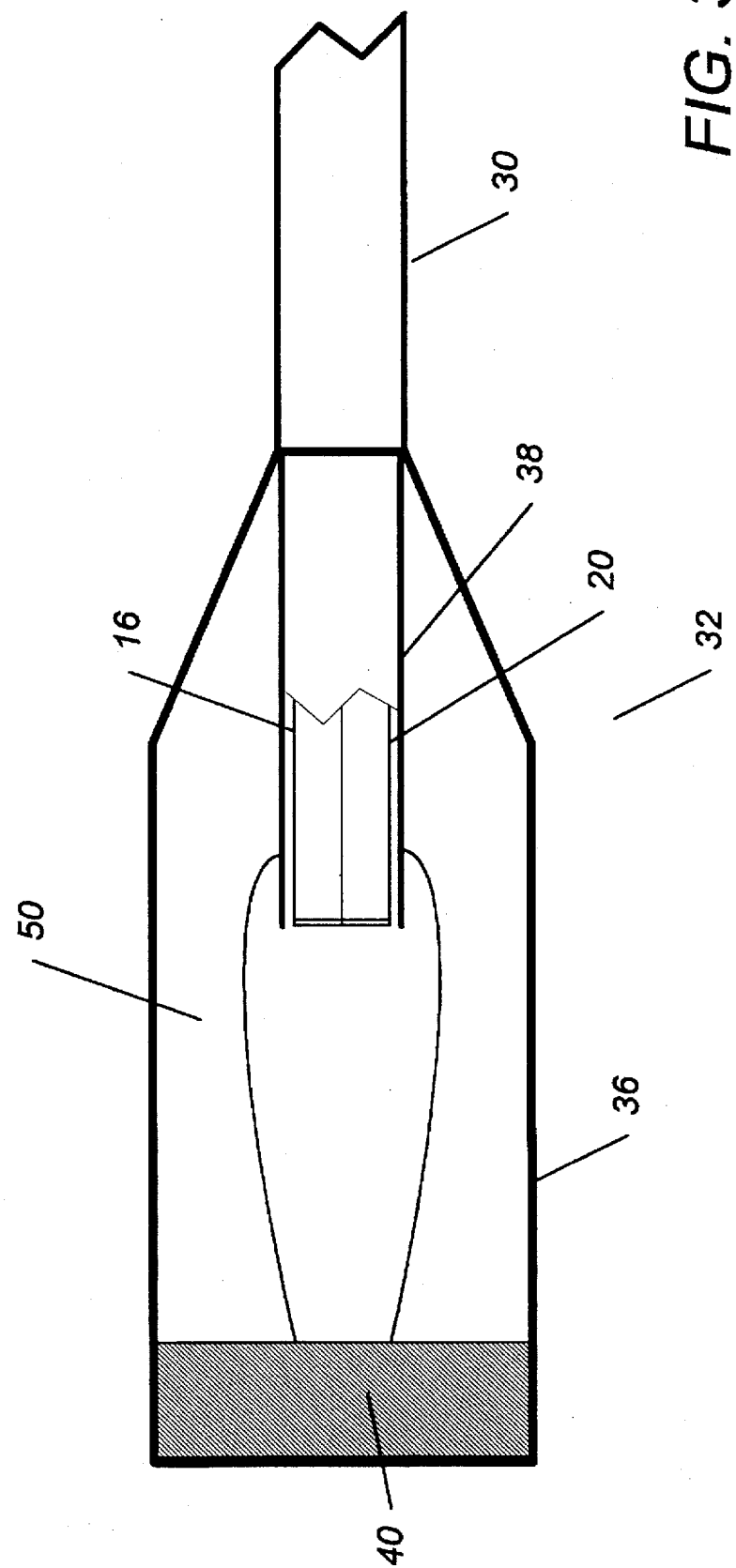
FIG. 3 is a schematic top view of the optical sensor of FIG. 1 showing a liquid cylinder formed inside the optical sensor.

Referring now to FIGS. 2–3 a schematic view of the sensor 32 is shown. The components of sensor 32 are disposed within a generally cylindrical housing 36. The housing 36 is preferably formed of a non-conductive material that is resistant to corrosion and to temperature extremes, such as PTFE. The cable 30 is connected to a proximal end of the housing 36 with the parallel strands 16 and 20 terminating in a common ferrule 38 which is longitudinally and centrally disposed within the housing 36. The ferrule 38 is preferably formed by binding the strands 16 and 20 in a side-by-side fashion with an epoxy or a similar coating substance. The terminating ends of the strands 16 and 20 are preferably polished to an optical quality surface perfectly perpendicular to the longitudinal axis of the housing 36, so as to maximize the light signal emitted by the strand 16 and received by the strand 20.

A reflector 40, which may be a mirror or any other reflective coating or surface, is disposed at or proximal to a distal end of the housing 36 opposite and in predeterminately spaced relation to the terminating end face of the ferrule 38. During the operation of the sensor 32 in a dry environment, when a light signal is emitted from the strand 16 the emitted light impedes on and is reflected from the reflector 40 and dispersed within the housing 36 so as to enable sufficient light to reflectively enter the strand 20 to cause the photosensor 18 to generate the $V_{DRY}$ voltage, thus causing the comparator 22 to power the dry indicator 26.

The apertures 34 are preferably defined in and throughout the circumferential wall of the housing 36, surrounding and spaced about the longitudinal axis of the housing 36 between the proximal and distal ends so as to permit entry of liquid into the housing 36 from the outer surface of the sensor 32. The size and position of each aperture 34 is preferably sufficient to draw at least a drop of any liquid in contact with it into the housing 36 by the commonly known phenomenon of capillary action. Of course, a large amount of liquid surrounding the sensor 32 or directed at sensor 32 under pressure may flood and substantially fill the interior of the housing 36. The number and position of apertures 34 may be varied without departing from the spirit of the present invention. For example, the apertures may be arranged in one or more longitudinally spaced circumferential groups of five apertures in each group. Alternatively, the outer surface of the housing 36 may be perforated with numerous small apertures. Accordingly, any configuration of apertures which allows and/or facilitates entry of liquid into the housing 36 by capillary action or by flooding is within the scope of the present invention. Thus, a single circumferential group of six apertures 34 is shown in FIG. 2 only by way of example.

When a small quantity of water or other liquid enters the housing 36 it adheres to the interior surface of the housing 36 and typically forms a liquid cylinder or conduit spanningly disposed between the ferrule 38 and the reflector 40. If the quantity of water in contact with the housing 36 is particularly small, a liquid film may form across one or more of the apertures 34 without any liquid actually entering the housing 36. Because the surface of water is reflective, the light signal emitted from the strand 16 is amplified by the liquid cylinder through multiple reflections from the liquid surface or by the liquid film before and/or after being reflected from the reflector 40, thus causing the light signal received by the strand 20 to be amplified. As a result, the photosensor 18 generates a correspondingly high voltage $V_{HIGH}$, causing the comparator 22 to power the wet indicator 28.

When a quantity of water or other liquid entering the housing 36 is sufficient to substantially flood the housing interior or to otherwise obstruct the path of light emitted from the strand 16 or received by the strand 20, the light signal emitted from the strand 16 is attenuated by the liquid medium before and/or after reflecting from the reflector 40, thus causing the light signal received by the strand 20 to be decreased in amplitude. As a result, the photosensor 18 generates a correspondingly low voltage $V_{LOW}$, causing the comparator 22 to power the wet indicator 28.

The magnitude of the numerical aperture (NA) characteristic of the strands 16 and 20, which affects the angle at which light enters and exits an optical fiber, should be sufficient to take advantage of the reflective qualities of the liquid cylinder. For example, if the NA is too low, the light signal will be directed only at the reflector 40 and may not be reflected from the internal wall of the liquid cylinder to a sufficient extent to effect the intended increase in amplitude. By way of example, an NA of 0.22 is sufficient for the exemplary dimensions of the sensor 32 outlined below.

The sensor 32 shown in FIG. 2 is not drawn to scale and is shown for illustrative purposes only. However, an optimized physical configuration of the sensor 32 is essential in maintaining its accuracy. The physical dimensions of importance include a distance 42 between the surface of the reflector 40 and the terminating end of the ferrule 38 (also represented by dimension A); a length 44 of the ferrule 38 extending into the housing 36 (also represented by dimension B); a diameter 46 of the internal portion of the housing 36 (also represented by dimension C); and a diameter 48 of each aperture 34 (also represented by dimension D). The magnitude and relation of each dimension A through D should be such that a droplet of water or other liquid entering the housing 36 will adhere to the interior surface of the housing 36 and form a liquid cylinder or conduit spanningly disposed between the ferrule 38 and the reflector 40 without coming into contact with the terminating ends of the strands 16 and 22. An example of a liquid conduit 50 spanningly disposed within the housing 36 is shown in FIG. 3. In addition, the magnitude of the dimension D is preferably sufficient to allow a film to form across at least one aperture 34 if the quantity of liquid in contact with the housing 36 is insufficient to form a liquid cylinder 50.

The selection of a magnitude of the dimension A should be made with the objective of maximizing the light signal received by the photosensor 18. This may be accomplished by placing the ferrule 38 as close to the reflector 40 as possible, while at the same time allowing enough room for the function and effect of a liquid cylinder, in the housing 36, to amplify the amount of the reflected light into the strand 20. Experimentation with water as a sensed liquid has shown that a dimension A of approximately 2-3 mm is sufficient, by way of example.

A magnitude of the dimension B should be sufficient to minimize the chance of any liquid entering the housing 36 from coming into contact with the terminating end of the ferrule 38, so that a liquid cylinder may be formed clear of the path of light emitted from the strand 16. Experimentation with water as a sensed liquid has shown that a dimension B of approximately 2.6-3.6 mm is sufficient, by way of example.

The selection of a magnitude of the dimension C should be made with the objective of making the diameter of the housing 36 large enough to allow the ferrule 38 to extend out into interior space without touching the inner surface of the housing 36, but small enough to allow liquid to enter the housing 36 and to creep along the inner surface of the housing 36 and create a liquid cylinder through capillary forces. For example, if the dimension C is too small, any liquid inside the housing 36 will tend to obstruct the direct path of light from the strand 16, while if the dimension C is too large any liquid inside the housing 36 will tend to pool in the lower part of the housing 36 instead of forming into a cylinder. Experimentation with water as a sensed liquid has shown that a dimension C of approximately 4 mm is sufficient, by way of example.

Finally, the selection of a magnitude of the dimension D should be made with the objective of making the diameter of each aperture 34 large enough to allow even a single drop of water or other liquid to enter into the housing 36 or to form a liquid film across the aperture 34, yet small enough to prevent the liquid from escaping once inside the housing. Experimentation with water as a sensed liquid has shown that a dimension D of approximately 2.5 mm is sufficient, by way of example.

The suggested values for the dimensions A through D are provided for illustrative purposes only and may easily be varied by those skilled in the art adhering to the guidelines provided above without departing from the spirit of the present invention. It should be noted that the dimensions A through D of the sensor 32 may also be varied to enable sensing of liquids with significantly different properties from water. For example, the dimension D may be enlarged for sensing liquids with a higher viscosity than water. In addition, since some liquids absorb certain colors of light and reflect others, the color of the light emitter 14 may be configured accordingly. For example, it may be advantageous to use light in the infrared region to detect a liquid that is opaque to visible light but transparent to infrared light. The preferred light wavelength for detecting water is approximately 850 nm.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. A system for sensing the presence of a liquid, comprising:

a light emitting device operable to emit a light signal of a pre-defined amplitude;

a transmitting fiber optic strand having a first end connected to said light emitting device and a second end, said transmitting strand being operable to transmit a light signal emitted by said light emitting device and to emit said first light signal through the second end;

a light sensing device operable to sense a plurality of light signals, each having a particular amplitude, and to derive, from each light signal of said plurality of light signals, a voltage value having a magnitude proportional to a magnitude of each light signal's particular amplitude;

a receiving fiber optic strand having a first end connected to said light sensing device and a second end, said receiving strand being operable to receive said plurality of light signals through the second end;

an optical sensor comprising:

a housing having opposed proximal and distal ends and defining a hollow interior of a predetermined cross-sectional size and bounded by a peripheral wall in and through which a plurality of apertures of predetermined size are defined at predetermined locations intermediate to said proximal and distal ends for permitting entry of liquid into the housing interior;

a ferrule projecting a predetermined extension distance into said housing interior from said housing proximal end and terminating in an end wall disposed in spaced confronting opposition to said housing distal end, said ferrule having a cross-sectional size smaller than said cross-sectional size of the housing interior so as to define a predetermined ferrule spacing between said ferrule and said housing peripheral wall, said ferrule retaining said fiber optic transmitting and receiving strands such that the second end of said transmitting strand and the second end of said receiving strand terminate in the housing at and coincident with said ferrule end wall; and a light reflector disposed in the housing interior proximate said distal end at a predetermined reflection distance from said ferrule end wall and oriented for receiving said light signal transmitted from said light source and entering the housing interior from said transmitting strand and for reflecting said received light signal onto the ferrule end wall for transmission of said reflected light signal through said receiving strand to said light sensing device, so that said light sensing device derives a first voltage corresponding to said predefined amplitude of said light signal;

at least a selected plurality of said reflection distance, said ferrule extension distance, said predetermined aperture locations and said aperture size being selected so that liquid entering the housing interior through said apertures forms a liquid conduit spanningly bridging said ferrule and said reflector and through and within which spanning liquid conduit said light signal entering the housing interior from said transmitting strand and reflected back to said receiving strand is also internally reflected by the liquid conduit such that an amplified reflected light signal transmitted to said light sensing device through said receiving strand has a greater amplitude than said light signal entering the housing through said transmitting strand from said light emitting device so that said light sensing device derives a second voltage corresponding to the greater amplitude of said amplified light signal;

comparing means, connected to said light sensing device, being operable to store a predefined third voltage, to compare said predefined third voltage to said first voltage and to said second voltage, to assert a first signal when said third voltage is substantially equal to said first voltage, and to assert a second signal otherwise; and indicator means, connected to said comparing means, operable to receive said first and said second signals and to indicate a dry condition when said first signal is received, and to indicate a wet condition when said second signal is received.

2. The system of claim 1, wherein:

when a quantity of liquid sufficient to obstruct said ferrule end wall enters the housing interior, said quantity of liquid causes the amplitude of said light signal light transmitted to said light sensing device through said receiving strand to decrease to a lower amplitude than the light entering the housing through said transmitting strand from said light emitting device, such that an attenuated reflected light signal transmitted to said light sensing device through said receiving strand has a lower amplitude than said light signal entering the housing through said transmitting strand from said light emitting device, so that said light sensing device derives a fourth voltage corresponding to the lower amplitude of said attenuated light signal; and said comparing means are further operable to compare said third voltage to said fourth voltage.

3. The system of claim 1 wherein said light emitting device further comprises means for emitting a pulsed light signal of a pre-determined frequency and amplitude.

4. The system of claim 1 wherein said light signal is infrared.

5. The system of claim 1 wherein said transmitting strand and said receiving strand are formed into an insulated cable.

6. The sensor of claim 1 wherein said indicator means further comprises means for transmitting said first and second signals to an external computer.

7. The system of claim 1 wherein the liquid is one of water and a liquid having substantially similar properties to water.

8. The system of claim 7 wherein the predetermined cross-sectional size of the housing interior is approximately 4 mm.

9. The system of claim 7 wherein the predetermined distance of said ferrule projection is selected from a range of approximately 2.6 to 3.6 mm.

10. The system of claim 7 wherein the predetermined reflection distance from said reflector to said ferrule end wall is selected from a range of approximately 2—3 mm.

11. The system of claim 7 wherein said aperture size is approximately 2.5 mm.

12. The system of claim 1 wherein said indicator means comprises first visual indicator means representative of the dry condition and responsive to said first signal, and second visual indicator means representative of the wet condition and responsive to said second signal.

13. The system of claim 12 wherein said second visual indicator means further comprises an audible indicator means responsive to said second signal.

14. A sensor, operable in conjunction with a source of light transmitted to the sensor from the source through a fiber optic transmitting strand and a device for detecting a change in amplitude of a light signal transmitted from the sensor to the device through a fiber optic receiving strand, for identifying a presence of a liquid in contact with the sensor, said sensor comprising:

a housing having opposed proximal and distal ends and defining a hollow interior of a predetermined cross-sectional size and bounded by a peripheral wall in and through which a plurality of apertures of predetermined size are defined for permitting entry of liquid into the housing interior;

a ferrule projecting a predetermined extension distance into said housing interior from said housing proximal end and terminating in an end wall disposed in spaced confronting opposition to said housing distal end, said ferrule having a cross-sectional size smaller than said cross-sectional size of the housing interior so as to define a predetermined ferrule spacing between said ferrule and said housing peripheral wall, said ferrule retaining the fiber optic transmitting and receiving strands such that each of the strands terminates in the housing at and coincident with said ferrule end wall; and a light reflector disposed in the housing interior proximate said distal end at a predetermined reflection distance from said ferrule end wall and oriented for receiving light transmitted from the source and entering the housing interior from the transmitting strand and for reflecting the received light onto the ferrule end wall for transmission of the reflected light through the receiving strand to the detecting device;

at least said ferrule spacing and said reflection distance being selected so that liquid entering the housing interior through said apertures forms a liquid conduit spanningly bridging said ferrule and said reflector and through and within which spanning liquid conduit light entering the housing interior from the transmitting strand and reflected back to the receiving strand is also internally reflected by the liquid conduit such that the reflected light transmitted to the detecting device through the receiving strand is of greater amplitude than the light entering the housing through the transmitting strand from the light source so that a detected increase in the amplitude of the light signal received by the detecting device indicates the presence of liquid in contact with the sensor.

15. The sensor of claim 14 wherein said light signal is infrared.

16. The sensor of claim 14 wherein said light signal is infrared.

17. The sensor of claim 14 wherein the liquid is one of water and a liquid having substantially similar properties to water.

18. The sensor of claim 17 wherein the predetermined distance of said ferrule projection is selected from a range of approximately 2.6 to 3.6 min.

19. The sensor of claim 17 wherein the predetermined reflection distance from said reflector to said ferrule end wall is selected from a range of approximately 2–3 mm.

20. The sensor of claim 14 wherein the liquid is one of water and a liquid having substantially similar properties to water.

21. The sensor of claim 20 wherein the predetermined cross-sectional size of the housing interior is approximately 4 mm.

22. The sensor of claim 20 wherein the predetermined distance of said ferrule projection is selected from a range of approximately 2.6 to 3.6 min.

23. The sensor of claim 20 wherein the predetermined reflection distance from said reflector to said ferrule end wall is selected from a range of approximately 2–3 mm.

24. The sensor of claim 20 wherein said aperture size is approximately 2.5 mm.

25. A sensor, operable in conjunction with a source of light transmitted to the sensor from the source through a fiber optic transmitting strand and a device for detecting a change in amplitude of a light signal transmitted from the sensor to the device through a fiber optic receiving strand, for identifying a presence of a liquid in contact with the sensor, said sensor comprising:

a housing having opposed proximal and distal ends and defining a hollow interior of a predetermined cross-sectional size and bounded by a peripheral wall in and through which a plurality of apertures of predetermined size are defined at predetermined locations intermediate said proximal and distal ends for permitting entry of liquid into the housing interior;

a ferrule projecting a predetermined extension distance into said housing interior from said housing proximal end and terminating in an end wall disposed in spaced confronting opposition to said housing distal end, said ferrule having a cross-sectional size smaller than said cross-sectional size of the housing interior so as to define a predetermined ferrule spacing between said ferrule and said housing peripheral wall, said ferrule retaining the fiber optic transmitting and receiving strands such that each of the strands terminates in the housing at and coincident with said ferrule end wall; and a light reflector disposed in the housing interior proximate said distal end at a predetermined reflection distance from said ferrule end wall and oriented for receiving light transmitted from the source and entering the housing interior from the transmitting strand and for reflecting the received light onto the ferrule end wall for transmission of the reflected light through the receiving strand to the detecting device;

at least a selected plurality of said reflection distance, said ferrule extension distance, said predetermined aperture locations and said aperture size being selected so that liquid entering the housing interior through said apertures forms a liquid conduit spanningly bridging said ferrule and said reflector and through and within which spanning liquid conduit light entering the housing interior from the transmitting strand and reflected back to the receiving strand is also internally reflected by the liquid conduit such that the reflected light transmitted to the detecting device through the receiving strand is of greater amplitude than the light entering the housing through the transmitting strand from the light source so that a detected increase in the amplitude of the light signal received by the detecting device indicates the presence of liquid in contact with the sensor.

26. A sensor, operable in conjunction with a source of light transmitted to the sensor from the source through a fiber optic transmitting strand and a device for detecting a change in amplitude of a light signal transmitted from the sensor to the device through a fiber optic receiving strand, for identifying a presence of a liquid in contact with the sensor, said sensor comprising:

a housing having opposed proximal and distal ends and defining a hollow interior of a predetermined cross-sectional size and bounded by a peripheral wall in and through which a plurality of apertures of predetermined size are defined at predetermined locations intermediate said proximal and distal ends for permitting entry of liquid into the housing interior; a ferrule projecting a predetermined extension distance into said housing interior from said housing proximal end and terminating in an end wall disposed in spaced confronting opposition to said housing distal end, said ferrule having a cross-sectional size smaller than said cross-sectional size of the housing interior so as to define a predetermined ferrule spacing between said ferrule and said housing peripheral wall, said ferrule retaining the fiber optic transmitting and receiving strands such that each of the strands terminates in the housing at and coincident with said ferrule end wall; and a light reflector disposed in the housing interior proximate said distal end at a predetermined reflection distance from said ferrule end wall and oriented for receiving light transmitted from the source and entering the housing interior from the transmitting strand and for reflecting the received light onto the ferrule end wall for transmission of the reflected light through the receiving strand to the detecting device;

wherein when a quantity of liquid sufficient to obstruct said ferrule end wall enters the housing interior, said quantity of liquid causes the amplitude of the reflected light transmitted to the detecting device through the receiving strand to decrease to a lower amplitude than the light entering the housing through the transmitting strand from the light source, so that a detected decrease in the amplitude of the light signal received by the detecting device indicates the presence of liquid in contact with the sensor.

27. The sensor of claim 26 wherein said light signal is infrared.

28. The sensor of claim 26 wherein the liquid is one of water and a liquid having substantially similar properties to water.

* * * * *